No. 711,575. Patented Oct. 21, 1902.
P. E. MALMSTROM & O. W. ACKERMAN.
APPARATUS FOR CARBONATING LIQUIDS.
(Application filed Oct. 4, 1898. Renewed Feb. 24, 1902.)
(No Model.) 3 Sheets—Sheet 1.
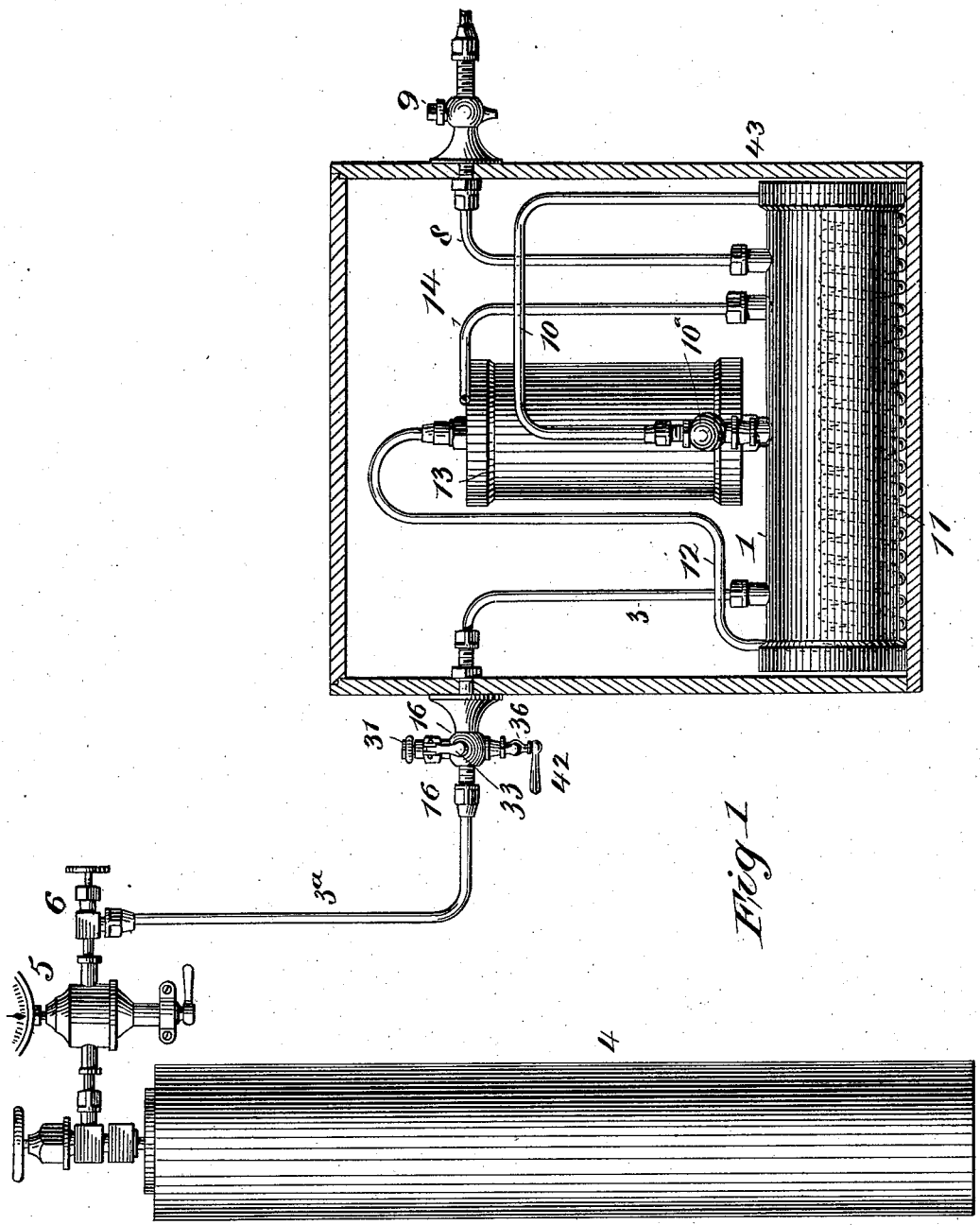
WITNESSES
INVENTORS
Peter E. Malmstrom
Otto W. Ackerman
BY
ATTORNEY

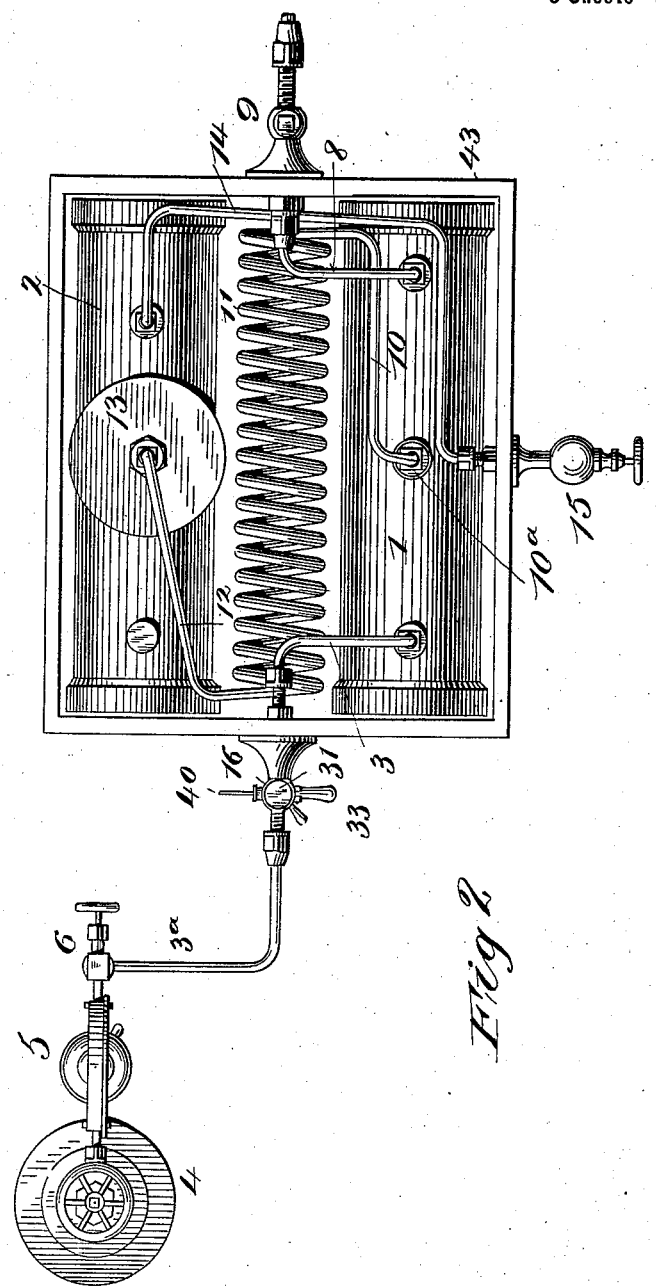

No. 711,575. Patented Oct. 21, 1902.
P. E. MALMSTROM & O. W. ACKERMAN.
APPARATUS FOR CARBONATING LIQUIDS.
(Application filed Oct. 4, 1898. Renewed Feb. 24, 1902.)
(No Model.) 3 Sheets—Sheet 3.
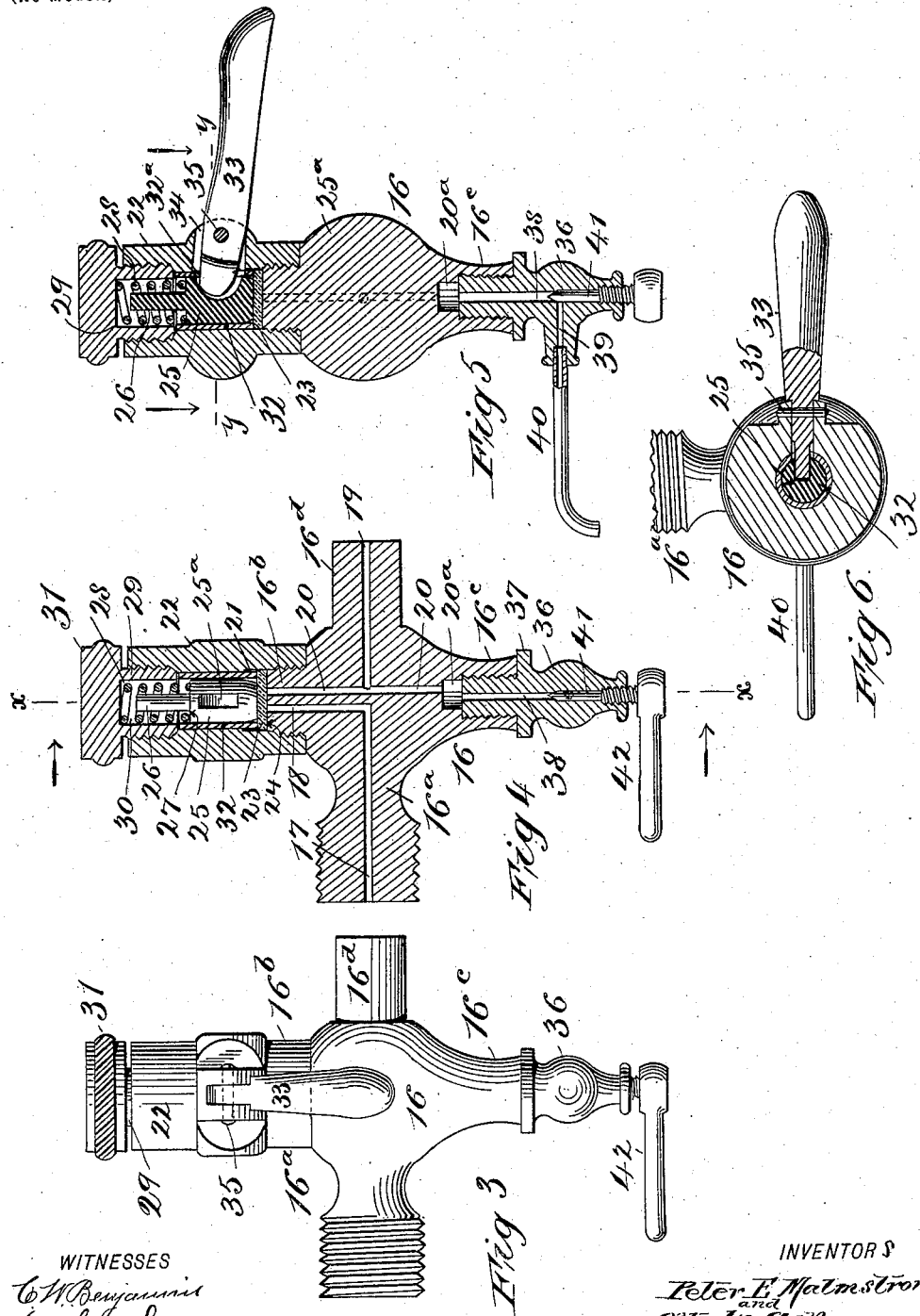
WITNESSES
INVENTORS
Peter E. Malmstrom
and
Otto W. Ackerman
BY
Joseph R. Levy
ATTORNEY

UNITED STATES PATENT OFFICE.

PETER E. MALMSTROM AND OTTO W. ACKERMAN, OF NEW YORK, N. Y., ASSIGNORS, BY MESNE ASSIGNMENTS, TO JOHN MULHOLLAND, OF NEW YORK, N. Y.

APPARATUS FOR CARBONATING LIQUIDS.

SPECIFICATION forming part of Letters Patent No. 711,575, dated October 21, 1902.

Application filed October 4, 1898. Renewed February 24, 1902. Serial No. 95,230. (No model.)

*To all whom it may concern:*

Be it known that we, PETER E. MALMSTROM and OTTO W. ACKERMAN, citizens of the United States, and residents of the city, county, and State of New York, have invented certain new and useful Improvements in Apparatus for Carbonating Liquids, of which the following is a specification.

Our invention relates to improvements in methods of and apparatus for carbonating liquids, wherein carbonated gas is caused to commingle with liquid—such, for instance, as water—to produce carbonated water.

In carrying out our invention we provide two cylinders or chambers, one of which is connected with gas and water inlet and also with a cooling-coil, which coil communicates through a filter with the other cylinder or chamber, and the latter communicates with a draw-off or outlet for the carbonated liquid. A check-valve is provided between the first-mentioned cylinder and the coil to prevent back pressure of gas, and a check-valve is provided in the liquid-inlet leading to the first-mentioned cylinder. The gas-inlet is also provided with a suitable cock or valve to control the gas and liquid in the corresponding cylinder. In carbonating the liquid in our apparatus gas under the desired pressure is let into one cylinder and passes thence through the coil and filter into the other cylinder and also fills the pipes. The gas is then draw off from the first-mentioned cylinder and liquid is admitted thereto until it is filled, whereupon gas is again admitted to said cylinder, but under increased pressure, and it thereupon acts to force the liquid from said cylinder through the coil and filter into the other cylinder, whereby the liquid and gas become thoroughly commingled, and the resulting carbonated liquid can be drawn off for use as desired.

It will be understood that the gas may be supplied from a suitable reservoir and a pressure-regulator interposed between said reservoir and the cylinders.

The invention also consists in the novel details of improvement and the combination of parts, that will be more fully hereinafter set forth, and then pointed out in the claims.

Reference is to be had to the accompanying drawings, forming part hereof, wherein—

Figure 1 is a side elevation of a carbonating apparatus embodying the invention, the casing being in section. Fig. 2 is a plan view thereof. Fig. 3 is a side elevation of a cock used to control the gas and the liquid. Fig. 4 is a central section thereof. Fig. 5 is a section on the line $x\,x$ of Fig. 4, and Fig. 6 is a horizontal section on the line $y\,y$ in Fig. 5.

Similar numerals of reference indicate corresponding parts in the several views.

1 2 indicate strong cylinders or chambers, which may be of suitable construction, and 3 is a pipe or tube leading to cylinder 1 to conduct gas thereto from a suitable gas-supply. We have shown a retort or reservoir 4 for containing carbonated gas to supply the cylinders, which retort is connected with pipe 3 by a pipe $3^a$ and other suitable connections, a gas-pressure regulator 5 being interposed in the line of piping in well-known manner, 6 being a stop-cock located in the piping between retort 4 and cylinder 1.

8 is a pipe that leads to cylinder 1 from a liquid or water supply, such as a street-main, and 9 is a check-valve connected with said pipe to close when pressure is greater in cylinder 1 than in the liquid-supply and to prevent exit of liquid and gas from cylinder 1. From cylinder 1 extends a pipe 10, that leads to a cooling-coil 11, and said coil leads by a pipe 12 to a filter 13, which latter is in communication with the interior of cylinder or chamber 2. $10^a$ is a check-valve in pipe 10 to prevent back pressure from cylinder 2 to cylinder 1. The filter 13 may be of the construction shown in the application for Letters Patent filed June 1, 1898, Serial No. 682,259, or otherwise. An outlet-pipe 14 extends from cylinder 2 and leads to a suitable draw-off cock 15, whereby the carbonated liquid can be drawn from the mixing-cylinder 2.

In order to conveniently regulate the passage of gas and liquid to and from the cylinder or chamber 1, we have provided a cock or valve 16, that is located between said cylinder and the pressure-regulator 5, being shown disposed between and connecting the pipes 3 and $3^a$. This cock or valve 16 is clearly illustrated in Figs. 3, 4, 5, and 6, and it consists, primarily, of a casting having four ways 17 18 19 20, that are controlled by valves. The way 17 extends through the hub $16^a$ to about the width of the casting, where it meets the way 18, that extends at right angles thereto through the hub $16^b$. The way 20 extends parallel to way 18 through hubs $16^b$ and $16^c$ and is joined by way 19, that extends parallel to way 17 through hub $16^d$. The ways 17 and 19 thus have no direct communication. The way 18 and one end of way 20 both open at the end of hub $16^b$ into a chamber 21, that is formed in a sleeve or extension 22, shown detachably connected with hub $16^b$ by screw-threads. Within chamber 21 is a valve to control ways 18 and 20. For this purpose we have shown a washer or disk 23, resting on a seat 24 at the end of the hub $16^b$ and closing ways 18 and 20, and upon this washer or disk rests a plunger 25, having a stem 26 and shoulder 27. 28 is a spring encircling said stem and bearing against said shoulder, 29 being an adjusting plug or cap having a recess 30 to receive the spring 28 and stem 26, which plug is shown connected with sleeve 22 by screw-threads, whereby it can be adjusted to regulate the tension of spring 28, said plug having a head or thumb piece 31 for its manipulation. The plunger 25 is shown guided in a sleeve 32, located in chamber 21 of sleeve 22. The normal action of spring 28 and plunger 25 is to keep ways 18 and 20 closed. The plunger 25 may be operated to permit the passage of gas from way 18 through chamber 21 to ways 20 and 19 by suitable means. We have shown a lever 33 pivotally connected with casting 16, the inner end of which lever is located in a recess 34 therein and pivoted on a pin or shaft 35, carried by said casting. The end $33^a$ of lever 33 passes through a slot $32^a$ in sleeve 32 and enters a recess $25^a$ in plunger 25, whereby as said lever is operated the plunger can be raised to allow gas to pass from way 18 to way 20.

$20^a$ is a bore or recess in hub $16^c$ of casting 16, which communicates with way 20, being substantially a continuation thereof, and said bore is provided with screw-threads that receive corresponding threads on a plug 36, that is provided with a shoulder 37, which bears against the outer end of hub $16^c$. The plug 36 has a longitudinal way or bore 38, that opens into bore $20^a$, and a bore 39, that opens into bore 38, and 40 is a spout connected with bore 39. Into bore 38 extends a pin or rod 41, that is provided with screw-threads which mesh with corresponding threads in bore 38, the length of pin 41 being such as to close bore 39 when screwed into bore 38 sufficiently.

42 is a handle on pin or rod 41 to operate it. Hub $16^a$ is connected with pipe $3^a$ and hub $16^d$ with pipe 3, the arrangement being such that when bore or way 39 is closed and plunger 25 raised gas will pass through ways 17 18 and chamber 21 to ways 20 and 19, and thus to cylinder or chamber, and when ways 17 and 20 are closed by washer 23 and bore or way 39 opened gas or liquid can pass from cylinder 1 through ways 19, 20, $20^a$, 38, and 39. By preference the cylinders 1 2, coil 11, filter 13, and the connecting-pipes are inclosed within a tank or vessel 43, adapted to receive ice to cool the coil and cylinders, and the parts 9, 15, and 16 may be attached to said vessel, as shown.

The operation of carbonating liquids by means of improvements is as follows: Draw-off cock 15 and way or bore 39 being closed, cock 6 is opened and plunger 25 is raised, whereupon gas will pass from pipe $3^a$ under the desired pressure through ways 17 18, chamber 21, ways 20 and 19, and pipe 3 to cylinder or chamber 1, from whence it will pass through pipe 10, coil 11, pipe 12, and filter 13 to cylinder 2. Plunger 25 is next allowed to close ways 18 and 20 and bore 39 is opened, whereupon the gas from cylinder or chamber 1 will escape through pipe 3 and ways 19, 20, $20^a$, 38, and 39, check-valve $10^a$ preventing the passage of gas from cylinder 2 and coil 11 to cylinder 1. The gas-pressure in cylinder 1 being thus reduced, liquid will enter cylinder 1 past check-valve 9 through pipe 8, and when the cylinder is filled the liquid will escape through bore or way 39, whereupon the latter will be closed. Cock 6 and valve 25 will again be opened, and gas under increased pressure will enter cylinder 1 and thereupon force the liquid from said cylinder through coil 11 and filter 13 into cylinder or chamber 2, whereby the liquid will be commingled with the gas in 11 and 2 and become carbonated. The carbonated liquid can then be drawn off through cock 15 as desired.

From the foregoing it will be seen that by the mere manipulation of valve 25 and pin or rod 41 the operation of carbonating liquid is performed, because by merely opening valve 25 and closing bore 39 the cylinders, coil, and pipe will be charged with gas. Then by closing valve 25 and opening bore 39 one of the cylinders will be emptied of gas and filled with liquid, and then by again closing bore 39 and opening valve 25 increased gas-pressure will cause the liquid to commingle with the gas first charged into the apparatus.

It is evident that the coil 11 can be dispensed with and pipes 10 and 12 connected to join cylinders 1 and 2 direct; also, that the cock 16 can be altered, if desired, but arranged in such manner as to permit the passage of gas to and from cylinder 1, and that other minor details can be changed to suit requirements. We therefore do not limit our invention to the details of construction shown and described, as they may be varied without departing from the spirit thereof.

Having described our invention, we claim—

1. The combination of two cylinders, a coil interposed between and connected with said cylinders, a gas-inlet for one cylinder, a cock interposed between said inlet and the source of supply and provided with means for admitting and withdrawing gas from said cylinder, a liquid-inlet therefor, a check-valve to control the supply of liquid to said cylinder, and an outlet for the other cylinder, substantially as described.

2. The combination of two cylinders, a coil interposed between and connected with said cylinders, a check-valve between said coil and one cylinder, a gas-inlet for said cylinder, a cock interposed between said inlet and the source of supply and provided with means for admitting and withdrawing gas from said cylinder, a liquid-inlet therefor, a check-valve to control the supply of liquid thereto, and an outlet for the other cylinder, substantially as described.

3. The combination of cylinders 1 and 2, a coil connected with cylinder 1, a check-valve between said coil and cylinder, a filter connected with cylinder 2, and also connected with said coil, a gas-inlet for cylinder 1, a cock 16 interposed between said inlet and the source of supply and provided with means for admitting and withdrawing gas from cylinder 1, a liquid-inlet therefor, a check-valve to control the supply of liquid to cylinder 1, and an outlet for cylinder 2, substantially as described.

4. In a carbonating apparatus, the combination with a cylinder or chamber, of a source of gas-supply, a pipe connecting said gas-supply with said cylinder, a cock located in said pipe provided with means for controlling the supply of gas to the cylinder to which said pipe is connected and with means for exhausting the gas therefrom, a liquid-supply pipe connected to that cylinder only to which said gas-supply pipe is connected, a valve for regulating the flow of liquid through said liquid-supply pipe, a pipe-coil connected at one end to that cylinder only which receives the gas direct from the gas-supply, a filter connected to the other end of said pipe-coil, a second cylinder adapted to receive the carbonated liquid only, a pipe connecting said cylinder with said filter, and an outlet connected with said second cylinder, whereby the carbonated liquid may be drawn therefrom, substantially as described.

5. In a carbonating apparatus, the combination with a cylinder or chamber 1, of a source of gas-supply, a pipe connecting said gas-supply with said cylinder, a cock 16 located in said pipe provided with means for controlling the supply of gas to the cylinder to which said supply-pipe is connected and with means for exhausting the gas from said cylinder, a liquid-supply pipe 8, connected to that cylinder only to which said gas-supply pipe is connected, a valve 9, for regulating the flow of liquid through said liquid-supply pipe, a pipe-coil 11, connected at one end to that cylinder only which receives the gas direct from said gas-supply, a filter 13, connected to the other end of said pipe-coil, a second cylinder 2, adapted to receive the carbonated liquid only, a pipe connecting said cylinder with said filter and an outlet connected with said second cylinder whereby the carbonated liquid may be drawn therefrom, substantially as described.

6. A cock comprising a casting having two chambers 20ª and 21, in vertical alinement with each other, a way 20, passing through the body of said cock and connecting one of said chambers with the other, a second way 17, passing through the body of said cock, a spring-controlled valve 25 located in the upper chamber, and acting to open or close both of said ways simultaneously into said chamber, a third way 19, passing through the body of said cock and passing directly into the way connecting said chambers, a plug 36, inserted in said lower chamber 20ª, a way 38 passing from said lower chamber through said plug, an outlet 39 leading into said way, and a pin-valve 47 controlling the connection from said way 38 to said outlet, substantially as described.

Signed in the city, county, and State of New York this 30th day of September, 1898.

PETER E. MALMSTROM.
OTTO W. ACKERMAN.

Witnesses:
WILLIAM CAROLSEN,
SERENA BEATRICE KUHN.